United States Patent [19]

Tanaka et al.

[11] Patent Number: 5,185,888
[45] Date of Patent: Feb. 9, 1993

[54] METHOD AND APPARATUS FOR DATA MERGING/SORTING AND SEARCHING USING A PLURALITY OF BIT-SLICED PROCESSING UNITS

[75] Inventors: Yuzuru Tanaka, 103, Fukuyama-mansion, 18-6-1, Minami, 17 Jonishi, Chuo-ku, Sapporo-shi, Hokaido; Akira Yamamoto, Yokohama; Masashi Tsuchida, Shibuya, all of Japan

[73] Assignees: Hitachi, Ltd., Tokyo; Yuzuru Tanaka, Sapporo, both of Japan

[21] Appl. No.: 767,852

[22] Filed: Aug. 21, 1985

[30] Foreign Application Priority Data

Aug. 22, 1984 [JP] Japan ............... 59-173309
Aug. 22, 1984 [JP] Japan ............... 59-173310

[51] Int. Cl.⁵ ............................................ G06F 7/22
[52] U.S. Cl. ............................ 395/600; 364/259.8; 364/DIG. 1; 364/229; 395/800; 395/325
[58] Field of Search ... 364/200 MS File, 900 MS File, 364/749; 395/600, 800, 325

[56] References Cited

U.S. PATENT DOCUMENTS

| | | | |
|---|---|---|---|
| 2,844,309 | 7/1958 | Ayres | 340/146.2 |
| 3,311,892 | 3/1967 | O'Connor et al. | 364/900 |
| 4,224,676 | 9/1980 | Appelt | 364/749 |
| 4,316,177 | 2/1982 | Hampez et al. | |
| 4,323,981 | 4/1982 | Nakamura | 364/749 |
| 4,393,468 | 7/1983 | New | 364/749 |
| 4,418,383 | 11/1983 | Doyle | 364/749 |
| 4,507,748 | 3/1985 | Cotton | 364/749 |
| 4,528,641 | 7/1985 | Burrows | 364/749 |
| 4,630,234 | 12/1986 | Holly | 364/900 |

FOREIGN PATENT DOCUMENTS

970726 9/1964 United Kingdom ............ 340/146.2

OTHER PUBLICATIONS

*Electronic Engineering* (mid Oct. 1978, vol. 50 No. 614).
*Applied Ideas*: Cascaded digital comparators with carry look-ahead,104 RAO, p. 26.
"Intelligent Buffer Reconciles Fast Processors and Slow Peripherals" by Hillman, *Electronics*, pp. 131-135, Sep. 11, 1980.
*IEEE Transactions on Computers*, vol. C-31, No. 12, Dec. 1982, pp. 1192-1201, by H. Yasukra et al.
*Computer*, vol. 11, No. 7, Jul. 1978, "Dynamic Architectures: Problems and Solutions" pp. 26-39, By Kartashev et al.
"Algorithm and Hardware for a Merge Sort Using Multiple Processors", *IBM Res. Develop.*, vol. 22, No. 5, Sep. 1978, pp. 509-517, by S. Todd.
"*Proceedings of the Tenth Intermechanical Conference on Very Large Data Bases*", Bit-Sliced VLSI Algorithms for Search and Sort by Yuzuru Tanaka, Aug. 1984.
IBM Technical Disclosure Bulletin, vol. 26, No. 6, Nov. 1983, "Compressed Dictionary for Word Verification", by Grossman et al., pp. 2831-2833.
*Computer Structures: Principles and Examples*, by Siewiorek, et al., pp. 168-219, copyright 1982.

*Primary Examiner*—Lawrence E. Anderson
*Attorney, Agent, or Firm*—Antonelli, Terry, Stout & Kraus

[57] ABSTRACT

In order to perform merging sorting which can flexibly cope with the variation of a data length, data is divided every predetermined number of bits (m bits), a plurality of processors each of which process the m-bit data are connected, and the alteration of the data length can be coped with by changing the number of the connected processors. On this occasion, in order to permit reduction in the quantity of information items which are exchanged among the respective processors, the merging sorting is so carried out that the processor processing certain m bits receives input information from only the processor processing immediately upper m bits and delivers output information to only the processor processing immediately lower m bits.

8 Claims, 13 Drawing Sheets

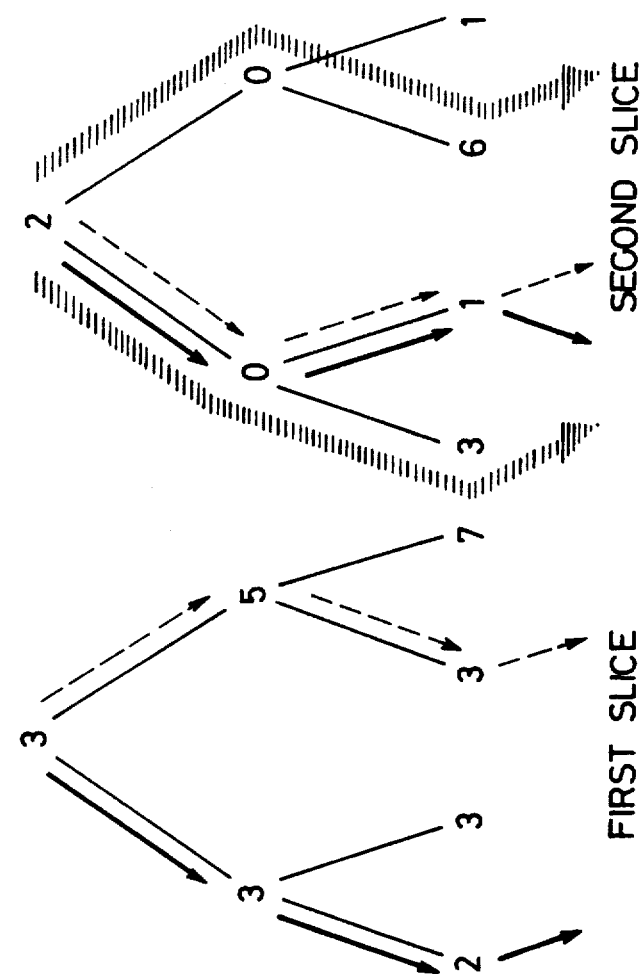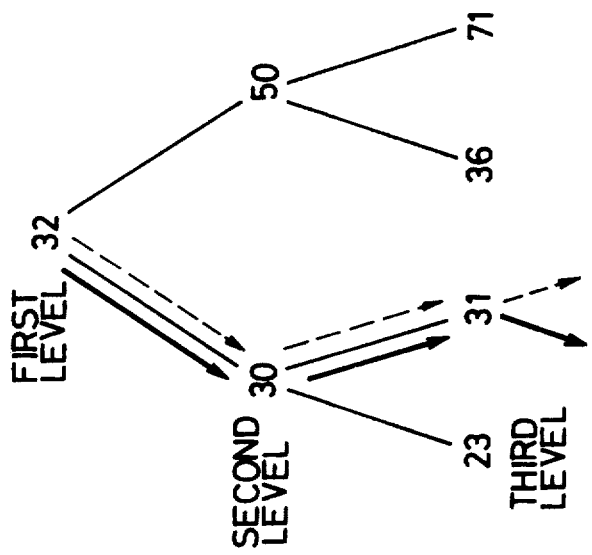

FIG. 8(a)

CALCULATION OF CO$^L$

| CASE | CI$^L$ | CI$^R$ | COND$^L$ | CO$^L$ |
|------|--------|--------|----------|--------|
| X$^L$ | 0<br>0<br>0<br>1<br>1 | 0<br>1<br>1<br>0<br>1 | –<br>F<br>T<br>–<br>– | 0<br>1<br>0<br>–<br>1 |
| L$^L$ | 0<br>0<br>1 | –<br>–<br>– | F<br>T<br>– | 1<br>0<br>1 |
| N$^L$ | –<br>– | –<br>– | F<br>T | 1<br>0 |
| R$^L$ | –<br>–<br>– | 0<br>1<br>1 | –<br>F<br>T | 0<br>1<br>0 |

FIG. 8(b)

CALCULATION OF CO$^R$

| CASE | CI$^L$ | CI$^R$ | COND$^R$ | CO$^R$ |
|------|--------|--------|----------|--------|
| X$^R$ | 0<br>0<br>0<br>1<br>1 | 0<br>1<br>1<br>0<br>1 | –<br>F<br>T<br>–<br>– | 0<br>1<br>0<br>–<br>1 |
| L$^R$ | 0<br>0<br>1 | –<br>–<br>– | F<br>T<br>– | 1<br>0<br>1 |
| N$^R$ | –<br>– | –<br>– | F<br>T | 1<br>0 |
| R$^R$ | –<br>–<br>– | 0<br>1<br>1 | –<br>F<br>T | 0<br>1<br>0 |

FIG. 8(c)

DETERMINATION OF NEXT STATE
(LEFT BOUNDARY) $COND^L$

| CASE | $CI^L$ | $CI^R$ | $COND^L$ | NEXT STATE |
|---|---|---|---|---|
| $X^L$ | 0 | 0 | - | $X^L$ |
|  | 0 | 1 | F | $R^L$ |
|  | 0 | 1 | T | $L^L$ |
|  | 1 | 0 | - | - |
|  | 1 | 1 | - | $X^L$ |
| $L^L$ | 0 | - | F | $N^L$ |
|  | 0 | - | T | $L^L$ |
|  | 1 | - | - | $L^L$ |
| $N^L$ | - | - | - | $N^L$ |
| $R^L$ | - | 0 | - | $R^L$ |
|  | - | 1 | F | $R^L$ |
|  | - | 1 | T | $N^L$ |

FIG. 8(d)

DETERMINATION OF NEXT STATE
(RIGHT BOUNDARY) $COND^R$

| CASE | $CI^L$ | $CI^R$ | $COND^R$ | NEXT STATE |
|---|---|---|---|---|
| $X^R$ | 0 | 0 | - | $X^R$ |
|  | 0 | 1 | F | $R^R$ |
|  | 0 | 1 | T | $L^R$ |
|  | 1 | 0 | - | - |
|  | 1 | 1 | - | $X^R$ |
| $L^R$ | 0 | - | F | $N^R$ |
|  | 0 | - | T | $L^R$ |
|  | 1 | - | - | $L^R$ |
| $N^R$ | - | - | - | $N^R$ |
| $R^R$ | - | 0 | - | $R^R$ |
|  | - | 1 | F | $R^R$ |
|  | - | 1 | T | $N^R$ |

METHOD AND APPARATUS FOR DATA MERGING/SORTING AND SEARCHING USING A PLURALITY OF BIT-SLICED PROCESSING UNITS

BACKGROUND OF THE INVENTION

1. Field of the Invention

The present invention relates to special-purpose hardware or a method for performing data merging/sorting and searching in a database or file processing, and more particularly to a method and apparatus for merging-/sorting and searching which are flexible with respect to change of data length.

2. Description of the Prior Art

As database-oriented hardware for merging/sorting and searching, there is, e.g., a heap sort type engine proposed by the inventors (Tanaka, Y. et al: Pipeline Searching and Sorting Modules as Components of a Data Flow Database Computer, IFIP Congress 80, pp. 427–432, Oct. 1980). This engine can completely overlap the transmission and sorting calculation of data, and can therefore perform a very efficient computation. This engine, however, has been problematic in the following points:

(1) Due to complicated circuitry, the number of elements is too large and poses a problem in the LSI implementation.

(2) There is no expansibility for the alteration of a data length.

Another sorting engine is, e.g., a merge sort type engine (Todd, S.: Algorithm and Hardware for a Merge Sort Using Multiple Processors, IBM J, R&D, vol. 22, no. 5, May 1978). Since the merge sort is simpler in the calculative system than the heap sort etc., it can simplify hardware, but it has not solved the problem (2).

SUMMARY OF THE INVENTION

In view of the above circumstances, the present invention consists in building an engine for sorting and searching which is flexible with respect to the change of data length, and it has for its object to provide a method and apparatus for merging, sorting and searching which meet the requirement of simplifying circuitry to the utmost in order to permit LSI implementation.

As means to realize expansibility for the change of data length, a method is considered which divides data every certain fixed number of bits (every m-th bit) and then calculates the divided data. Concretely, this becomes an arrangement in which a plurality of processors each processing the m-bit data are connected. The change of the data length can be coped with by altering the connected number of processors. In this case, it is required to exchange information among the processors, and the quantity of the exchange information needs to be rendered small. The present invention is so constructed that the processor processing certain m bits receives input information from only the processor processing the immediately preceding upper m bits and delivers output information to only the processor processing the immediately succeeding lower m bits.

According to the present invention, a merging sorter can be built, in general, by serially connecting mergers.

Further, as regards searching, a searching engine is constructed through bit slicing, and a plurality of bit sliced engines are connected. The change of data length is coped with by altering the connected number of bit sliced engines. In this case, the quantity of transmission of control information among the bit sliced engines needs to be suppressed to the minimum from the viewpoint of LSI implementation.

Therefore, the present invention is so constructed that the particular bit sliced engine receives the control information from only the immediately preceding upper-digit bit sliced engine and delivers the control information or the calculated result of the particular bit sliced engine to only the immediately succeeding lower-digit bit sliced engine.

BRIEF DESCRIPTION OF THE DRAWINGS

FIGS. 7(a) and 7(b) are flow diagrams showing the searching process of a searching engine according to the present invention;

FIGS. 8(a), 8(b), 8(c) and 8(d) are diagrams for explaining the transition states of the searching process of the present invention;

DETAILED DESCRIPTION OF THE PREFERRED EMBODIMENTS

Now, the present invention will be described in conjunction with one embodiment.

In general, the merging sorting is to obtain (N+M) sorted data from N data and M data already sorted respectively. Concretely, first of all, the two head data of the respective sets are compared to preferably output the smaller data in case of sorting the data in the ascending order or the larger data in case of sorting the data in the descending order. Subsequently, the compared data in the unselected set and the next data in the selected set are subjected to a similar calculation. In this way, the sorting of the (M+N) data ends.

Figure 1:
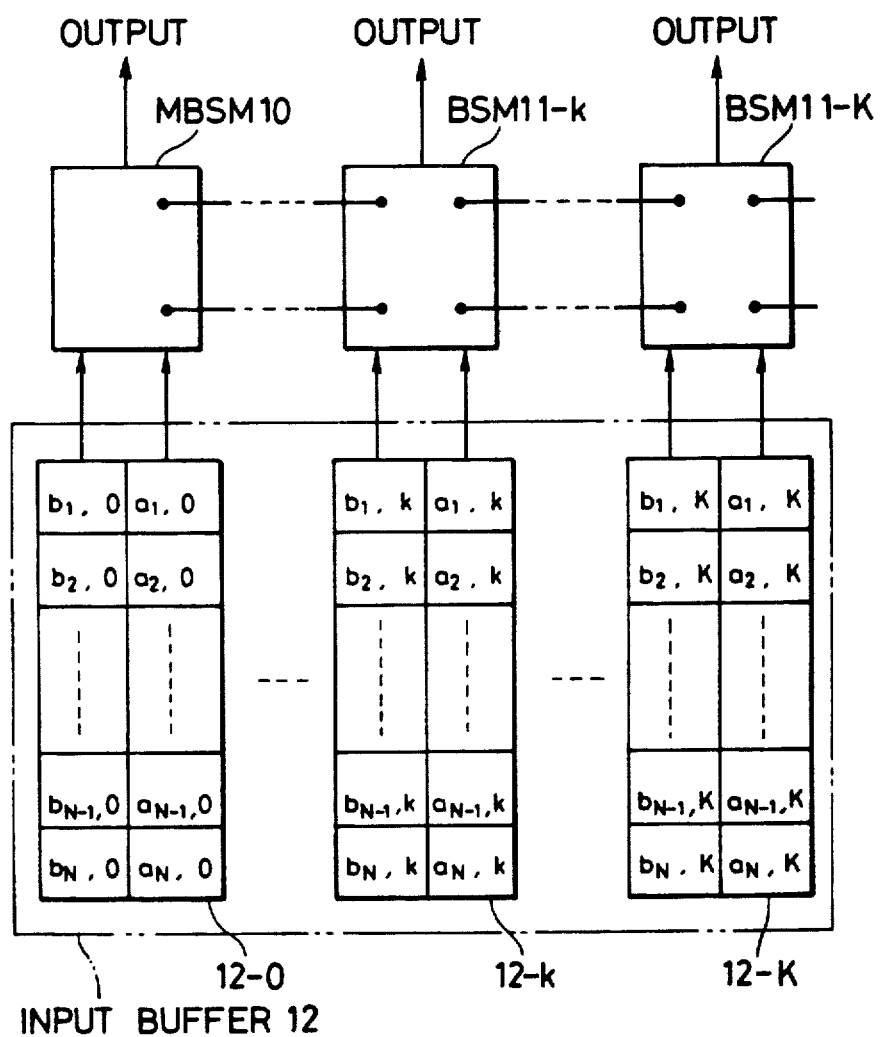
FIG. 1 is a general arrangement diagram of a merging/sorting apparatus according to the present invention.

FIG. 1 is a block arrangement diagram of a merging-/sorting apparatus according to the present invention. The merging sorter is constructed of bit sliced mergers each of which calculates and compares m bits, and input buffers. Here, the bit sliced merger which calculates the m bits of the uppermost digit (=0) is a modified bit sliced merger 10 (hereinbelow, abbreviated to 'MBSM 10'), and the bit sliced mergers which calculate the ensuing m bits respectively are bit sliced mergers 11 (hereinbelow, abbreviated to 'BSMs 11'). In addition, the k-th BSM 11 as reckoned from the uppermost digit is called BSM 11-k (the MBSM 10 shall correspond to k=0). Here, it is assumed that the numbers of data in the respective sets are equal and are designated N. It is also assumed that the sorting in the ascending order is to be performed here. $R_n$ indicates the n-th data of one set (n: L→N), and $L_n$ the n-th data of the other set. $R_{n,k}$ and $L_{n,k}$ are respectively the data of the k-th m bits as reckoned from the upper digits of the data $R_n$ and $L_n$ (k=0 shall indicate the data of the m bits of the uppermost digit). Accordingly, $R_{n,0}$ and $L_{n,0}$ indicate data to be input to the MBSM 10, and $R_{n,k}$ and $L_{n,k}$ data to be input to the BSM 11-k. The input buffers 12 are buffers which store these input data. In this regard, the input buffer 12-0 is the buffer for storing the data $L_{n,0}$ and $R_{n,0}$ (n: 0→N), and the input buffer 12-k is the buffer for storing the data $R_{n,k}$ and $L_{n,k}$. Practicable storage charts are shown in FIG. 1.

The MBSM 10 delivers two control information to the BSM 11-1, and the BSM 11-k obtains two input information from the BSM 11-k−1 and delivers two output information to the BSM 11-k+1. The MBSM 10 and the BSM 11 differ as to the presence and absence of input information.

Figure 2:
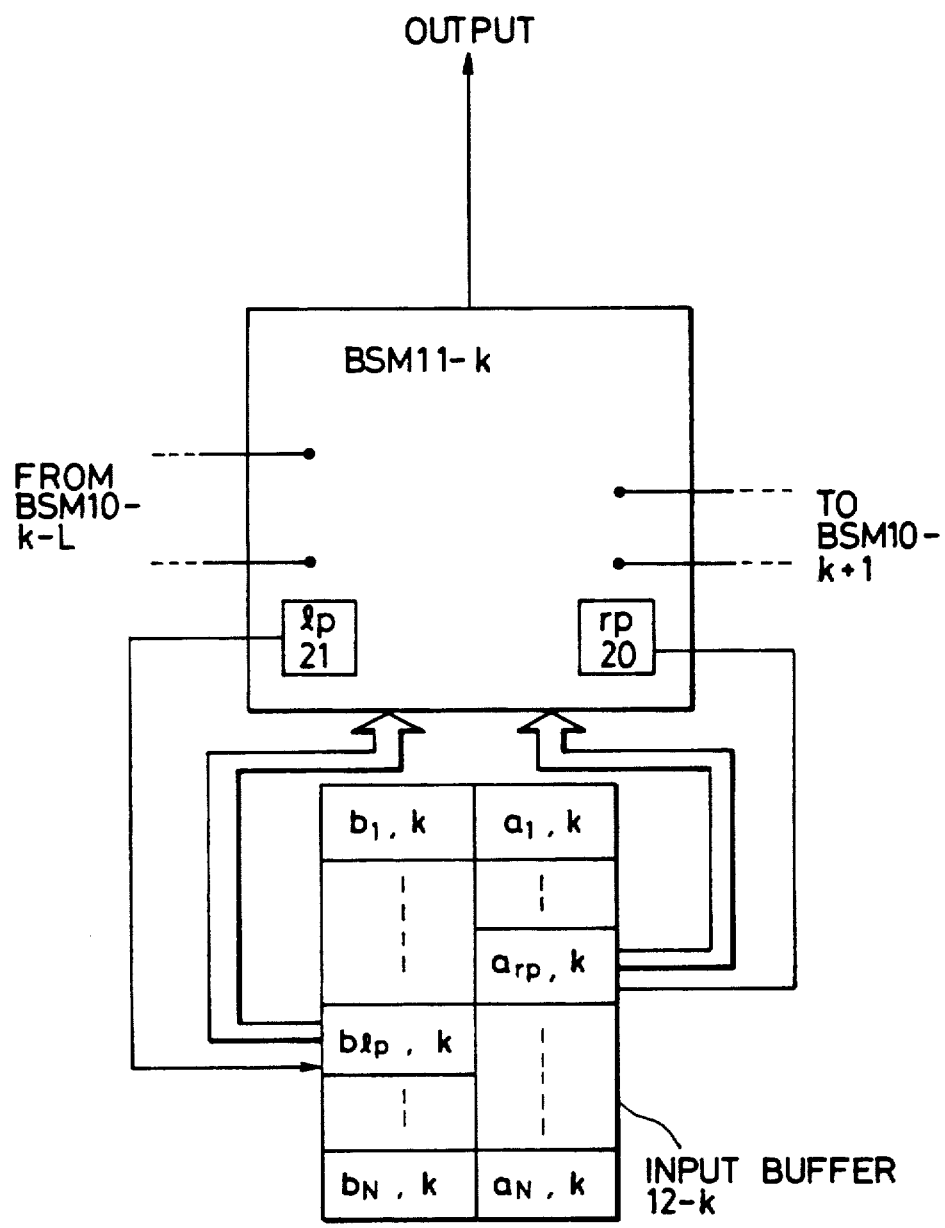
FIG. 2 is a diagram showing the stored form and output form of input data in the present invention.

FIG. 2 illustrates in detail a method of inputing data to-be-sorted to the BSM 11-k. A method of inputing data to-be-sorted to the MBSM 10 and a method of outputing a calculated result therefrom are similar to the illustrated method. The BSM 11-k has two pointers rp20 and lp21. The pointer rp20 is an input pointer for the data $R_{n,k}$, while the pointer lp21 is an input pointer for the data $L_{n,k}$. Accordingly, the BSM 11-k receives as its input data the data in the input buffer 12-k pointed to by the pointers rp20 and lp21, that is, the rp-th data of the data $R_{n,k}$ and the lp-th data of the data $L_{n,k}$ respectively. Concretely, the data $R_{rp,k}$ and $L_{lp,k}$ become the input data.

Figure 3:
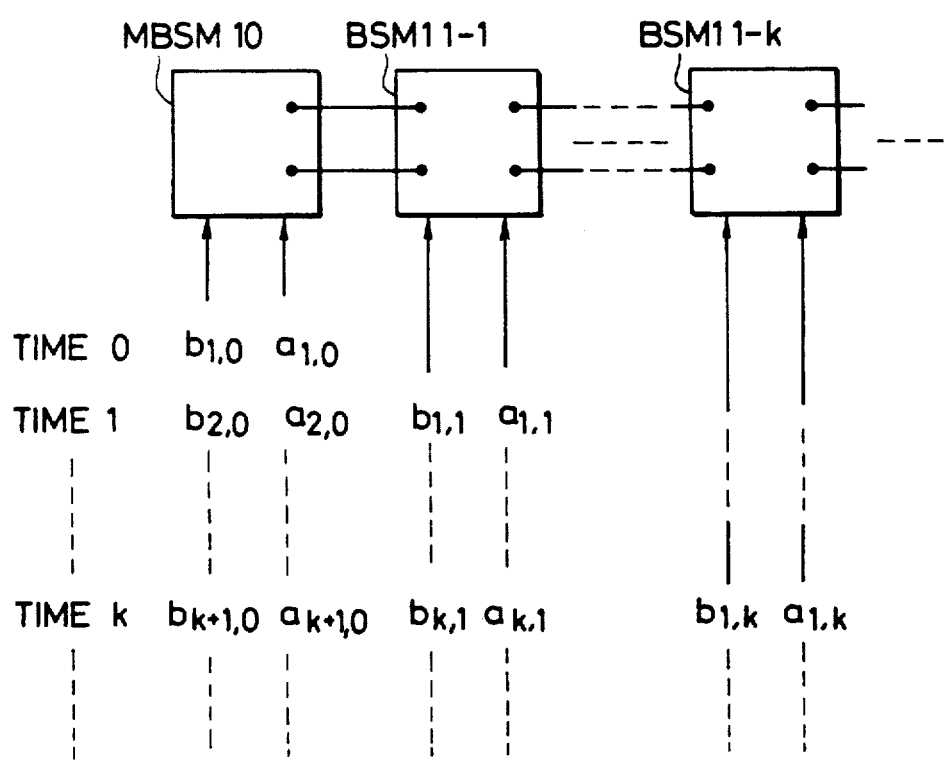
FIG. 3 is an explanatory diagram showing the input timings of data in the present invention.

On this occasion, as illustrated in FIG. 3, it is assumed that data $a_{1,0}$ and $b_{1,0}$ are input from the buffer 12-0 to the MBSM 10 at a time 0. Then, it is at a time k that data $a_{1,k}$ and $b_{1,k}$ are input from the buffer 12-k to the BSM 11-k. That is, the calculation of the BSM 11-k proceeds with a delay of one time with respect to that of the BSM 11-k−1. Likewise, the output of data is delayed by one time in succession. The reason is that, when data $a_{n,k}$ and $b_{n,k}$ are to be calculated in the BSM 11-k, the calculated result of data $a_{n,k-1}$ and $b_{n,k-1}$ needs to be known. The BSM 11-k obtains information concerning this, from the BSM 11-k−1.

Figure 4:
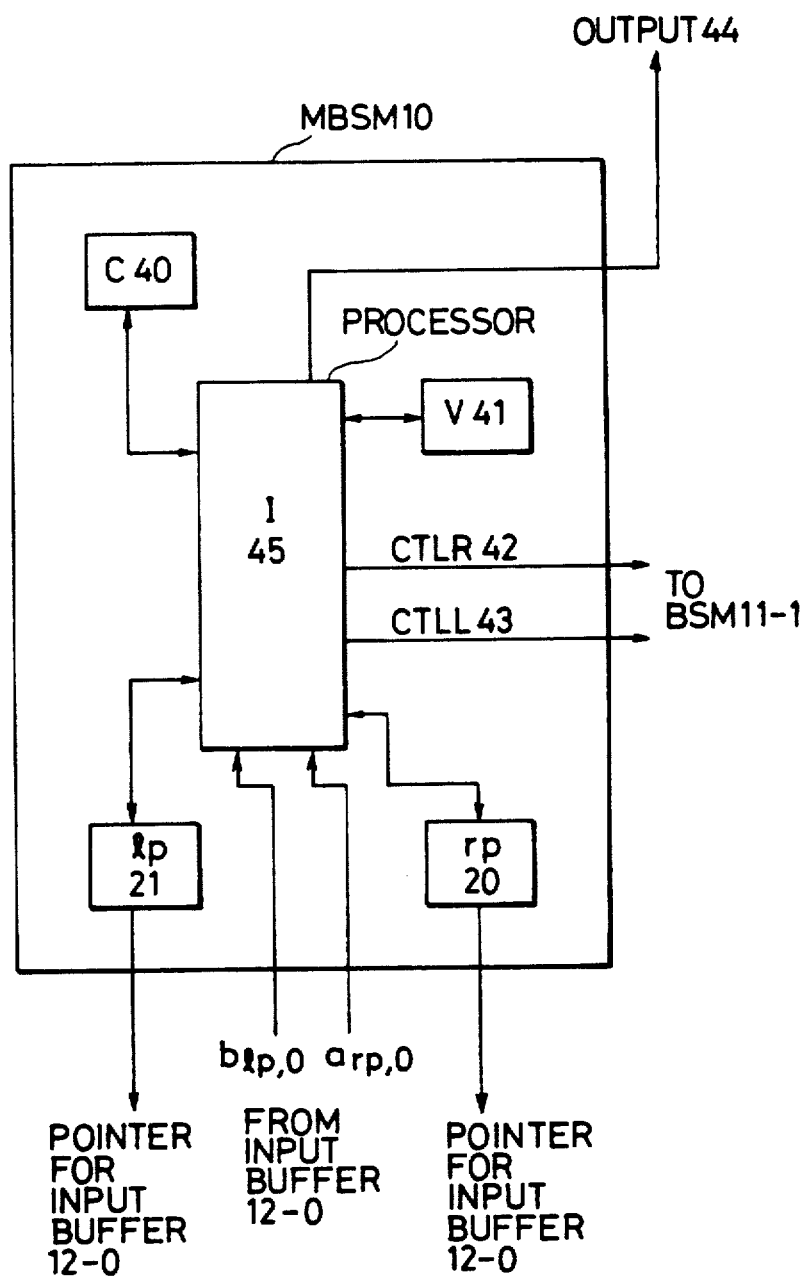
FIG. 4 is a block diagram showing the arrangement of a modified bit sliced engine in the present invention.
Figure 5:
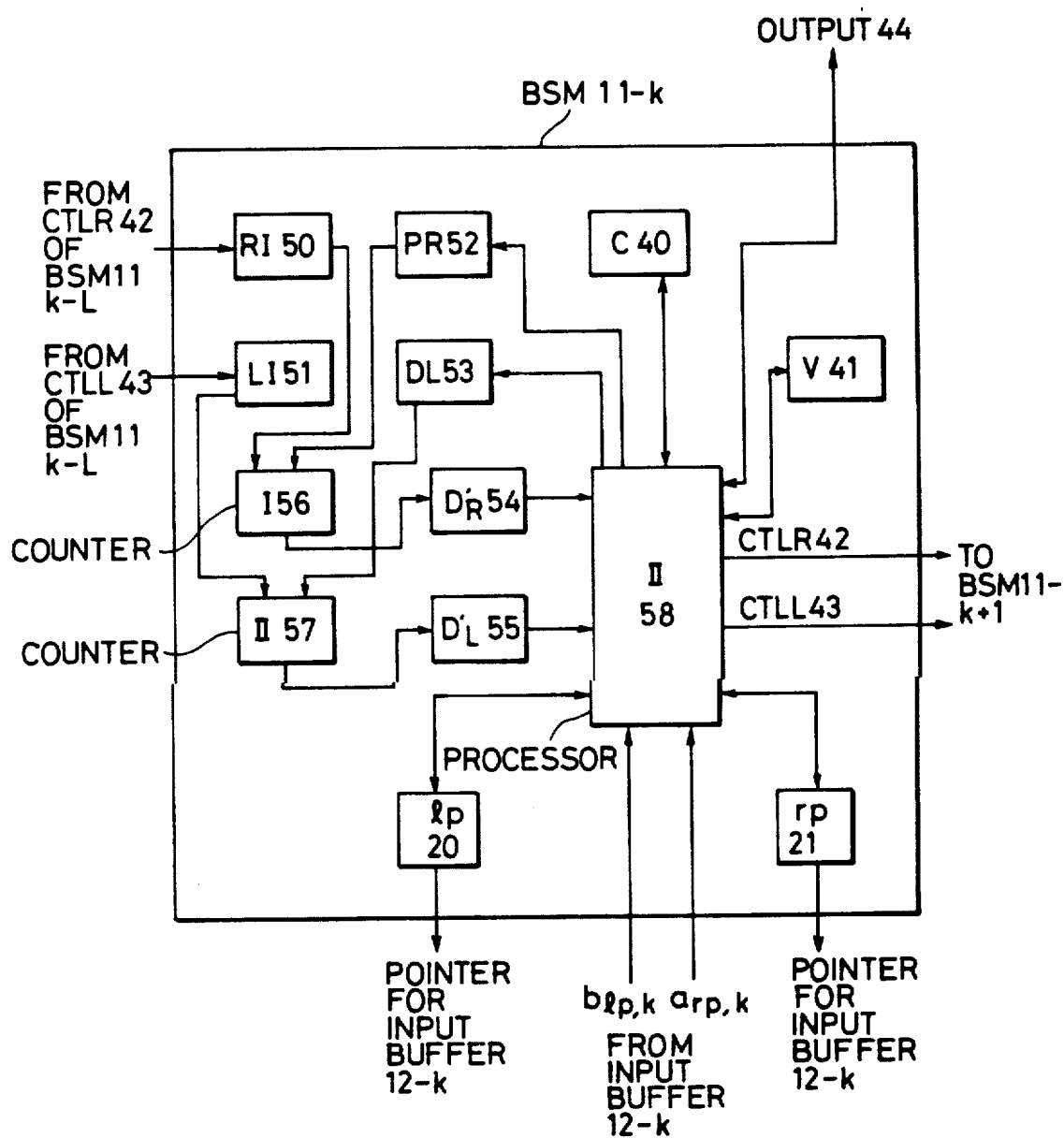
FIG. 5 is a block diagram showing the arrangement of a bit sliced merger.

Next, FIG. 4 shows the detailed arrangement of the MBSM 10, and FIG. 5 the detailed arrangement of the BSM 11-k. Since the MBSM 10 processes the m bits of the uppermost digit, it may merely deliver the smaller one of data $b_{lp,0}$ and $a_{rp,0}$ to a data output line OUTPUT 44. On the other hand, in the case of the BSM 11-k, a number to be selected changes depending upon the calculated result of the upper digit. For example, in a case where data $b_{lp,1}$ and $a_{rp,1}$ are compared by the BSM 11-1, the data $a_{rp,1}$ must be output irrespective of the magnitudes of the data $b_{lp,1}$ and $a_{rp,1}$ if $b_{lp,0} > a_{rp,0}$ holds. The reason is that, when the data $b_{lp,1}$ is output in this case, it is delivered in spite of the data $b_{lp,0}$ not having been output at the upper digit yet. Since the data $b_{lp,0}$ and $b_{lp,1}$ are obtained by slicing a number $b_{lp}$, outputing them separately makes it impossible to obtain a correct result. In this case, a value to be output can be determined according to the magnitudes of the data $b_{lp,1}$ and $a_{rp,1}$ for the first time when $b_{lp,0} = a_{rp,0}$ has held. In the present invention, these judgements are made on the basis of the difference of the pointer from that of the calculator of the upper digit. That is, when the difference of the pointer from that of the upper digit has become null, it is found that the particular pointer must not be advanced. (The fact that the pointer of the lower digit goes ahead of the pointer of the upper digit, signifies that a number not delivered at the upper digit has been output at the lower digit.) In a case where the calculator of the upper digit has advanced the pointers rp20 and lp21 as the result of the calculation of data $b_{lp,k}$ and $a_{rp,k}$, it brings corresponding control information output lines CTLR 42 and CTLL 43 to "1", and in any other case, it brings them to "0", so as to inform the lower-digit calculator of the situation. (This is common to all of the MBSM 10 and the BSMs 11.) The lower-digit calculator receives the "1" or "0" at blocks RI 50 and LI 51. (The MBSM 10 need not be provided with these portions because it has no upper-digit calculator.) Regarding the difference of the pointer from that of the upper-digit calculator, when the pointer of the particular calculator itself is advanced by adding the content of the block RI 50 and LI 50, this value may be subtracted. Blocks DR 52 and DL 53 denote the differences of the pointers with respect to the upper-digit calculator (DR 52 concerns the pointer rp20, and DL 53 the pointer lp21). However, in executing the calculations with the data $a_{rp,k}$ and $b_{lp,k}$, the control information items from the upper digit have already entered the blocks RI 50 and LI 51. Therefore, the calculations need to be carried out according to the values obtained by adding the contents of the blocks RI 50 and LI 50 to the differences DR 52 and DL 53 respectively. Block D'R 54 and D'L 55 denote the results of the additions, and a counter I 56 and a counter II 57 are provided in order to execute the additions. When the contents of the blocks RI 50 and LI 51 are "1", the respective counters increase the contents of the blocks DR 52 and DL 53 by one and deliver the results to the blocks D'R 54 and D'L 55, whereas when the contents of the blocks RI 50 and LI 51 are "0", the respective counters supply the blocks D'R 54 and D'L 55 with the contents of the blocks DR 52 and DL 53 as they are. The blocks DR 52, DL 53, D'R 54 and D'L 55 and the adders I 56 and II 57 do not exist in the MBSM 10 because they are portions required for grasping the differences of the pointers with respect to the upper digit.

Meanwhile, with this idea, when $a_{rp,k} = b_{lp,k}$ holds in case of intending to select and output the smaller one of the data $a_{rp,k}$ and $b_{lp,k}$, both the pointers rp20 and lp21 need to be put forward. By way of example, it is assumed that $a_{1,0} = b_{1,0}$. On this occasion, since the BSM 11-1 must select the smaller one of data $a_{1,1}$ and $b_{1,1}$, it must get the MBSM 10 to advance both the pointers so that the values of the blocks D'R 54 and D'L 55 of the BSM 11-1 may be "1" when this BSM 11-1 executes the calculation of the data $a_{1,1}$ and $b_{1,1}$. (When the MBSM 10 advances only one of the pointers rp and lp, either of the differences (D'R 54, D'L 55) of the pointers thereof relative to those of the BSM 11-1 becomes null, and hence, a hindrance will arise if the smaller one of the data $a_{1,1}$ and $b_{1,1}$ is the data to which the difference of the pointers is null.) Even when both the pointers rp20 and lp21 are moved, one data is output. It is therefore necessary to store the fact that one pointer has been excessively advanced. A block C 40 stores the number of times by which the pointers have been moved in excess. Besides, in order to store what value has been accumulated, the output result is stored in a block V 41.

The accumulated result is discharged in the following three cases: (1) The case where neither of the pointers can be advanced any longer. (2) The case where only either of the pointers can be advanced and where a value indicated by the pointer to be advanced differs from the content of the block V 41. (3) The case where both the pointers can be advanced and where the smaller one of the values indicated by the respective pointers differs from the content of the block V 41.

Thus far, the portions other than the processor I 45 of the MBSN 10 and the processor II 58 of the BSM 11-k have been described. Now, the functions of the two processors will be stated. As already stated, the difference between the MBSM 10 and the BSM 11-k is whether or not the limitation of the calculated result of the upper-digit calculator is imposed. In a case where neither of the contents of the blocks D'R 54 and D'L 55 is zero, the BSM 11-k has the differences of the pointers of its own from the pointers of the upper-digit calculator, and hence, it may advance both the pointers rp20 and lp21, so that it is not subject to the limitation of the result of the upper-digit calculator. Accordingly, the processed content of the processor I 45 becomes equal to that of the processor II 58 for D'R 54$\neq$0 and D'L 55$\neq$0. Therefore, the functions of the processor II 58 in respective cases will be explained here.

Case 1: D'R 54=D'L 55=C 40=0. Case 1 is not existent. This signifies that neither of the pointers lp20 and rp21 can be advanced and that there is no data accumulated up to now. In this situation, there is quite no data to be output. Since, however, the BSM 11-k delays by one time interval as compared with the BSM 11-k−1, at least one data to be output exists.

Case 2: D'R 54=D'L 55=0 and C 40>0.

Since, in this case, the pointers rp20 and lp21 cannot be advanced, data accumulated up to now is output. Accordingly, the following operations are executed:

CTLR 42←0, CTLL 43←0, OUTPUT 44←V 41, C 40←C 40 - 1, DL 53←D'L 55, DR 52←D'R 54

Case 3: D'L 55=0 and D'R 54>0

In this case, the pointer lp21 cannot be moved. This case is further divided into two cases:

Case 3. 1: C 40=0 or $a_{rp,k}$=V 41

In this case, the data $a_{rp,k}$ may be output, and the pointer rp20 may be advanced. The content of the block C 40 need not be altered. Accordingly, operations indicated below are executed:

CTLR 42 ← 1, CTLL 43 ← 0,

OUTPUT 44 ← $a_{rp,k}$, V 41 ← $a_{rp,k}$,
rp20 = rp20 + 1, DL 53 = D'L 55,
DR 52 = D'R 54 - 1

Case 3. 2: C 40$\neq$0 and $a_{rp,k}\neq$V 41

In this case, there is data accumulated in the past, and moreover, the data $a_{rp,k}$ differs from the content of the block V 41, so that the accumulated data needs to be first output.

CTLR 42←0, CTLL 43←0, OUTPUT 44←V 41. C 40←C 40 - 1, DR 52←D'R 54, DL 53 D'L 55

Case 4: D'L 55>0 and D'R 54=0

This case is reverse to Case 3 in the relationship of D'L 55 and D'R 54, and becomes a form symmetric to that of Case 3.

Case 4. 1: C 40=0 or $b_{lp,k}$=V 41.

Operated results are as follows: CTLR 42←0, CTLL 43←1, OUTPUT 44←$b_{lp,k}$, V 41←$b_{lp,k}$, lp21←lp21+1, DL 53←D'L 55 - 1, DR 52←D'R 54

Case 4. 2: C 40$\neq$0 and $b_{lp,k}\neq$V 41.

Operated results are indicated below.

CTLR 42←0, CTLL 43←0, OUTPUT 44←V 41, C 40←C 40 - 1, DL 53←D'L 55, DR 52←D'R 53

Case 5: D'L 55>0 and D'R 54>0

Since, in this case, there is room for advancing both the pointers lp21 and rp20, the data $a_{rp,k}$ and $b_{lp,k}$ can be compared. In this regard, MiN ($a_{rp,k}$, $b_{lp,k}$) shall indicate the smaller one of the values of the data $a_{rp,k}$ and $b_{lp,k}$.

Case 5. 1: MiN ($a_{rp,k}$, $b_{lp,k}$)$\neq$V 41 and C 40$\neq$0

In this case, there is data accumulated, and the value of the block V 41 is smaller than both the data $a_{rp,k}$ and $b_{lp,k}$, so that the accumulated data needs to be first output. The following operated results are obtained:

CTLR 42←0, CTLL 43←0, OUTPUT 44←V 41. C 40←C 40 - 1, DL 53←D'L 55, DR 52←D'R 54

Case 5. 2: C 40=0 or MiN ($a_{rp,k}$, $b_{p,k}$)=V 41

In this case, operated results are determined by the values of the data $a_{rp,k}$ and $b_{lp,k}$.

Case 5. 2. 1: $a_{rp,k}$>$b_{lp,k}$

In this case, the data $b_{lp,k}$ is output. Operated results become as follows:

CTLR 42 ← 0, CTLL 43 ← 1,

OUTPUT 44 ← $b_{lp,k}$, V 41 ← $b_{lp,k}$, lp21 ← lp21 + 1, DL 53 ← D'L 55 - 1,

DR 52 ← D'R 54

Case 5. 2. 2: $a_{rp,k}$<$b_{lp,k}$

In this case, the data $a_{rp,k}$ is output. Operated results become as follows:

CTLR 42 ← 1, CTLL 43 ← 0,

OUTPUT 44 ← $a_{rp,k}$, V 41 ← $a_{rp,k}$, rp20 ← rp20 + 1, DL 53 ← D'L 55,

DR 52 ← D'R 54 - 1

Case 5. 2. 3: $a_{rp,k}$=$b_{lp,k}$

In this case, either value may be output. Both the pointers lp21 and rp20 are put forward, and the content of the block C 40 is increased by one:

CTLR 42 ← 1, CTLL 43 ← 1,

OUTPUT 44 ← $a_{rp,k}$, V 41 ← $a_{rp,k}$.

-continued $$C\ 40 \leftarrow C\ 40 + 1, \quad lp21 \leftarrow lp21 + 1,$$

$$rp20 \leftarrow rp20 + 1, \quad DL\ 53 \leftarrow D'L\ 55 - 1,$$

$$D'R\ 52 \leftarrow D'R\ 54 - 1$$

Figure 6:
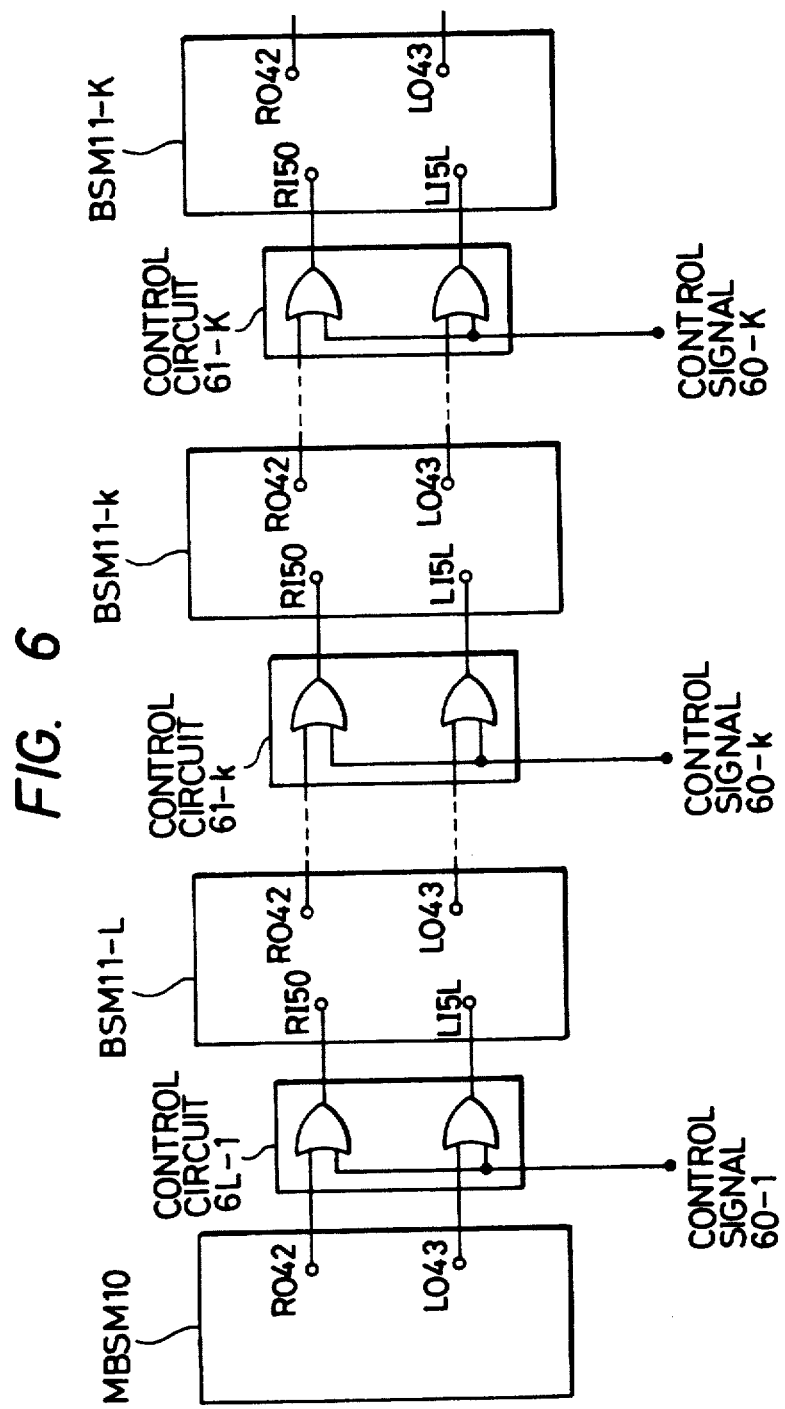
FIG. 6 is a diagram showing a method of building one device for merging long data or a plurality of devices for merging short data.

The functions of the processor 1 of the MBSM 10 become equal to those in Case 5. Therefore, when the blocks RI 50 and LI 51 of the BSM 11 are normally set at "1", the BSM 11 performs function equivalent to those of the MSBM 10. Accordingly, by furnishing each BSM 11 with a control circuit 61 and turning a control signal 62 ON and OFF as illustrated in FIG. 6, the blocks RI 50 and LI 51 can be respectively supplied with outputs RO 42 and LO 43 from the upper digit as they are (in the case of the control signal 62=OFF) or can be always supplied with "1" (in the case of the control signal 62=ON). The BSM 11-k whose control signal 62-k has been turned ON functions equivalently to the MBSM 10 which processes the m bits of the uppermost digit. Accordingly, a processor for sorting one long data can be built by turning OFF all the control signals 62-k, and a plurality of processors for sorting short data respectively can be built by turning ON the control signals 62-k in proper places.

Next, an embodiment for searching will be described. A searching engine performs a collective searching process.

Key words which are data to be searched are arrayed in the ascending order or in the descending order. The key words are stored as the structure of a left shift binary tree (hereinbelow, abbreviated to 'LSBT') (refer to, for example, the first-mentioned literature). The searching process termed here signifies that the key words are stored as the LSBT structure beforehand, that the operations between the LSBT and a search key are executed, and that the range of addresses which store the key words agreeing with the search key is found.

FIGS. 7(a) and 7(b) are diagrams for explaining the searching process of the searching engine. The searching engine stores the key words in the form of the LSBT structure as shown in FIG. 7(a). The key words are stored at the respective levels of the LSBT as follows. '32' is stored at the first level, '30' and '50' are stored at the second level, and '23', '31', '36' and '71' are stored at the third level. The searching process of the searching engine is started from the root node of the LSBT, namely, the first level in FIG. 7(a) and proceeds to the leaf nodes, to consequently find the range of memory bank addresses having the key words equal to the search key. In FIG. 7(a), the courses along which the LSBT is traced in the searching process when the search key is '31' are indicated by solid lines and broken lines. The solid lines indicate a process for obtaining the least one of the memory bank addresses which have the key words fulfilling the relation of being larger than or equal to the search key, while the broken lines indicate a process for obtaining the least one of the memory bank addresses which have the key words fulfilling the relation of being larger than the search key. In FIG. 7(a), the key words (23, 30, 31, 32, 36, 50, 71) are stored in the ascending order in the order in which the smaller address precedes. As regards the solid lines, the key word 32 of the first level and the search key 31 are compared, with the result that the left side of the LSBT is traced because the search key is smaller. Subsequently, the key word 30 of the second level and the search key 31 are compared, with the result that the right side of the LSBT is traced because the search key is larger. Lastly, the key word 31 of the third level and the search key 31 are equal, so that the left side of the LSBT is traced. Then, the process ends. As a result, the LSBT has been traced at the left, right and left. When '0' is caused to correspond to the left and '1' to the right, it is understood from address $010_2$ ($=2$) that the key word equal to the search key is stored. This address is called the left boundary. Likewise, as regards the broken lines, the key word 32 of the first level and the search key 31 are compared, with the result that the left side of the LSBT is traced because the search key is smaller. Subsequently, the key word 30 of the second level and the search key 31 are compared, with the result that the right side of the LSBT is traced because the search key is larger. Lastly, the key word 31 of the third level and the search key 31 are equal, so that the right side of the LSBT is traced unlike the case of finding the left boundary. Then, the process ends. As a result, the LSBT has been traced at the left, right and right. When '0' is caused to correspond to the left and '1' to the right, it is understood from address $011_2$ ($=3$) that the key word larger than the search key is stored. This address is called the right boundary. The left boundary fulfills the property that it is larger than or equal to the right boundary.

Thus far, there has been described an example in which two-digit numerals are the objects of the searching process. Now, an example which realizes the searching process by the use of bit sliced engines is illustrated in FIG. 7(b). When two-digit numerals are subjected to one-digit numeral bit slicing, two bit sliced engines are used. In the first slice, key words (2, 3, 3, 3, 3, 5 and 7) are stored in the order of addresses, while in the second slice, key words (3, 0, 1, 2, 6, 0 and 1) are stored in the order of the addresses. A search key 31 is also subjected to the one-digit numeral bit slicing, and 3 and 1 are respectively input as search keys in the first slice and the second slice. In both the slices, the search process starts from a first level and ends at a third level and determines a left boundary and a right boundary. With the bit sliced engines, the comparison of the first level of the second slice needs to be processed using the calculated result of the first level of the first slice. In general, the calculated result of the l-th level of the k-th slice needs to be used for processing the comparison of the l-th level of the (k+1)-th slice. The range between the left boundary and the right boundary determined with the first slice has the feature that, at the same level, it is wider than the range between the left boundary and the right boundary determined with the second slice. This is understood from the fact that the hatching parts of the second slice in FIG. 7(b) indicate the left boundary and the right boundary of the first slice and that the left boundary and the right boundary of the second slice exist within an area enclosed with the hatchings.

Next, there will be explained means for determining the searching course of the second slice by the use of the searching course of the first slice. First, a procedure for finding the left boundary will be explained. Let's consider four cases as the searching process.

Case $X^L$: The left boundary and right boundary of the first slice and the left boundary of the second slice are in agreement.

Case $L^L$: The left boundary of the first slice and the left boundary of the second slice are in agreement, and the right boundary of the first slice is greater than the two.

Case $N^L$: The left boundary of the first slice, the left boundary of the second slice and the right boundary of the first slice are greater in the order mentioned.

Case $R^L$: The right boundary of the first slice and the left boundary of the second slice are in agreement, and the left boundary of the first slice is smaller than the two.

Control information which is transmitted from the first slice to the second slice is information $CO^L$ which indicates at each level that the left boundary of the first slice has moved leftwards or rightwards. The information $CO^L$ assumes {0, 1}, and it becomes '0' in the case of the leftward movement of the left boundary and '1' in the case of the rightward movement. These control information items are also used for creating memory bank addresses storing the key words which are compared in order to determine the left boundary and the right boundary at the next level in each slice. In addition, the moving direction of the left boundary of the first slice is denoted by $CI^L$, and that of the right boundary of the first slice by $CI^R$. Information $COND^L$ assumes a truth value which indicates that the key word is greater than or equal to the search key or that the left boundary is greater than the address storing the key word.

The information $CO^L$ is determined from the above four inputs; the searching process $\{X^L, L^L, N^L, R^L\}$, $CI^L$, $CI^R$ and $COND^L$. The state transition diagram is shown in FIG. 8(a). In the same way, control information $CO^R$ indicative of the movement of the right boundary is determined. The state transition diagram is shown in FIG. 8(b).

Lastly, the state transition of the searching process will be considered in order to grasp the searching process of the first slice with the second slice as to the same level. When the state of the searching process for determining the left boundary is paired with the state of the searching process for determining the right boundary, the following seven combinations exist:

($X^L$, $X^R$): Left boundary of the first slice
‖
Left boundary of the second slice
‖
Right boundary of the second slice
‖
Right boundary of the first slice ($L^L$, $L^R$): Left boundary of the first slice
‖
Left boundary of the second slice
‖
Right boundary of the second slice
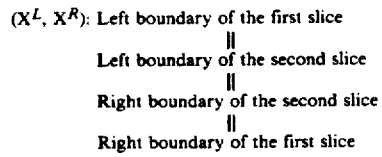
Right boundary of the first slice ($L^L$, $N^R$): Left boundary of the first slice
‖
Left boundary of the second slice
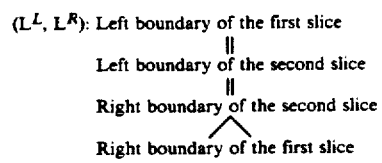
Right boundary of the second slice
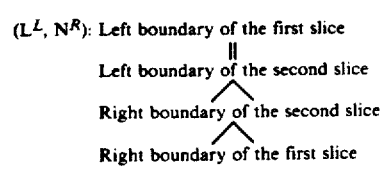
Right boundary of the first slice ($L^L$, $R^R$): Left boundary of the first slice
‖
Left boundary of the second slice
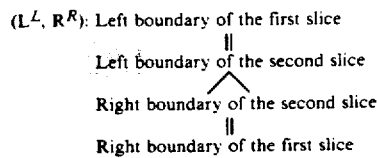
Right boundary of the second slice
‖
Right boundary of the first slice ($N^L$, $N^R$): Left boundary of the first slice
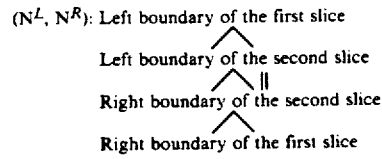
Left boundary of the second slice
‖
Right boundary of the second slice
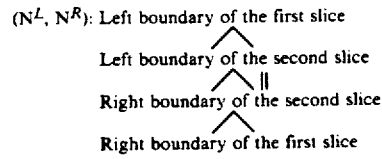
Right boundary of the first slice ($N^L$, $R^R$): Left boundary of the first slice
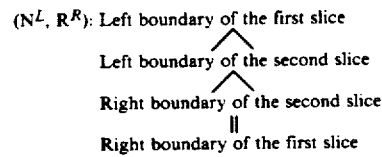
Left boundary of the second slice
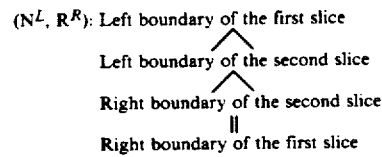
Right boundary of the second slice
‖
Right boundary of the first slice ($R^L$, $R^R$): Left boundary of the first slice
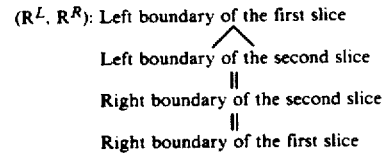
Left boundary of the second slice
‖
Right boundary of the second slice
‖
Right boundary of the first slice The searching process starts at the first level with ($X^L$, $X^R$) as an initial state. FIG. 8(c) shows a state transition diagram of the searching process of the left boundary, while FIG. 8(d) shows a state transition diagram of the searching process of the right boundary.

The above searching course can be expressed with two automatons each having four inputs, and can afford the searched result. While the example has referred to the searching engine of the LSBT construction of three levels composed of the two bit sliced engines, a searching engine of the LSBT construction of l levels can be similarly realized using k bit sliced engines.

Figure 9:
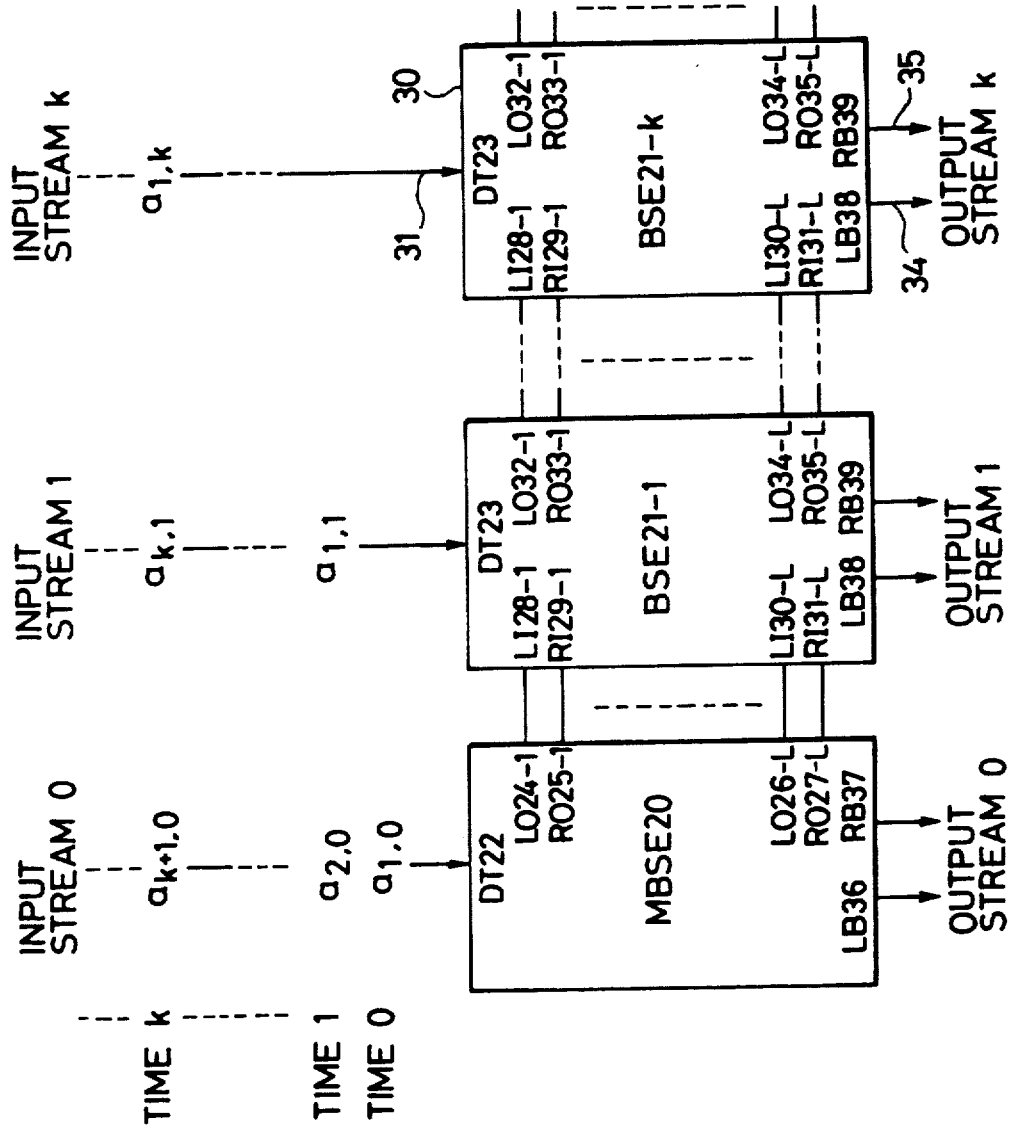
FIG. 9 is a diagram showing a method of inputing a search key to the searching engine of the present invention.

FIG. 9 illustrates a method of inputing a search key to the searching engine of the present invention. In FIG. 9, bit sliced engines numbering (k+1) are comprised. Here, the engine which executes the searching process of the m bits of the uppermost digit of the search key is called the modified bit sliced engine 20 (hereinbelow, abbreviated to 'MBSE 20'), while the engines other than the MBSE 20, each of which executes the searching process of the corresponding m bits of the search key are called the bit sliced engines 21 (abbreviated to 'BSEs 21'). The bit sliced search key which is input to each engine is called an input stream, while address information which is output from each engine is called an output stream. In this regard, the MBSE 20 receives an input stream 0 and delivers an output stream 0, the BSE 21-1 receives an input stream 1 and delivers an output stream 1, and thenceforth, the BSE 21-k receives an input stream k and delivers an output stream k. Regarding the MBSE 20, symbol DT 22 denotes a port for inputing the most significant m bits (input stream 0) of the search key, symbol LB 36 a port for outputing the least one of memory bank addresses which store key words fulfilling the relation of being equal to or larger than the search key, and symbol RB 37 a port for outputing the least one of memory bank addresses which store key words fulfilling the relation of being larger than the search key. Symbols LO 24-1 and RO 25-1 denote output ports for calculated results at the first level of the MBSE 20, and thenceforth, symbols LO 26-L and RO 27-L denote output ports for calculated results at the L-th level of the MBSE 20. Regarding each BSE 21, symbol DT 23 denotes a port for inputting the corresponding m bits of the bit sliced search key, symbol LB 38 a port for outputting the least one of memory bank addresses which store key words fulfilling the relation of being equal to or larger than the search key, and symbol RB 39 a port for outputting the least one of memory bank addresses which store key words fulfilling the relation of being larger than the search key. Symbols LI 28-1 and RI 29-1 denote input ports for the control information signals of the first level which are input from the slice of the immediate upper digit, and thenceforth, symbols LI 30-L and RI 31-L denote input ports for the control information signals of the L-th level which are input from the slice of the immediate upper digit. Symbols LO 32-1 and RO 33-1 denote output ports for calculated results at the first level, and thenceforth, symbols LO 34-L and RO 35-L denote output ports for calculated results at the L-th level. As shown in FIG. 9, the search key is divided into m-bit slices numbering (k+1). it is assumed that data $a_{1,0}$ be input to the MBSE 20 at a time 0. It is at a time k that data $a_{l,k}$ is input to the BSE 21-k. That is, the calculation of the BSE 21-k proceeds with a delay of one time interval relative to that of the BSE 21-k−1. This is based on the fact that the calculation of the data $a_{1,k}$ in the BSE 21-k requires a calculated result on data $a_{l,k-1}$ in the BSE 21-k−1. The BSE 21-k obtains control information concerning them, from the BSE 21-k−1.

Figure 10:
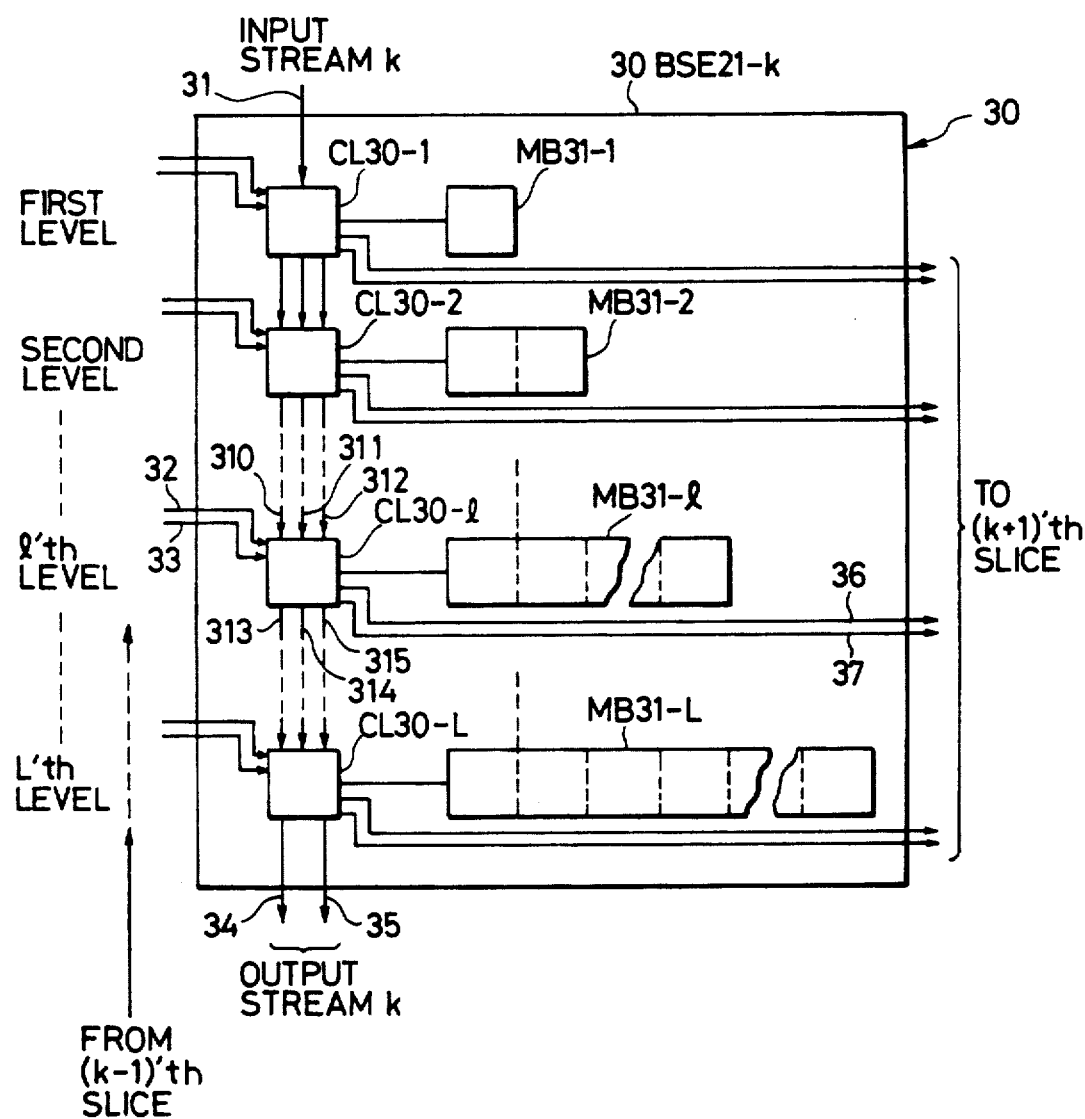
FIG. 10 is an arrangement diagram of a bit sliced engine.

FIG. 10 is a block diagram of the bit sliced engine. It corresponds to the BSE 21-k in FIG. 9. The bit sliced engine is constructed of control circuits 30 (hereinbelow, abbreviated to 'CLs 30'), and memory banks 31 (hereinbelow, abbreviated to 'MBs 31') for storing key words. Since the key words are stored as the LSBT structure, one word is stored in the MB 31-1 of the first level, two words are stored in the MB 31-2 of the second level, ..... and $2^{L-1}$ words are stored in the MB 31-L of the L-th level. The searching process of the searching engine of the present invention is started from the root of the LSBT structure. The operated result between the MB 31-1 of the first level and a search key is transmitted, whereupon operations similarly proceed to the lower levels. The range of locations which store the key words agreeing with the search key is found from the operated result between the MB 31-L of the L-th level and the search key. The control circuits 30 of the respective levels within the bit sliced engine shown in FIG. 10 are common.

Input information and output information at each level will be explained. Here, the l-th level will be referred to. Numeral 32 designates control information indicative of the moving direction of a left boundary, which has been determined as the result of the operation at the l-th level of the (k−1)-th slice, while numeral 33 designates control information indicative of the moving direction of a right boundary, which has been similarly determined as the result of the operation at the l-th level of the (k−1)-th slice. Numeral 310 indicates the search key which is compared with the key word of the l-th level. Control information items 311 and 312 respectively inform the l-th level of the corresponding slice, of the movements of a left boundary determined as the result of the operation at the (l−1)-th level and a right boundary determined as the result of the operation at the (l−1)-th level. Control information items 36 and 37 respectively inform the l-th level of the (k+1)-th slice, of the movements of the left boundary and the right boundary at the particular level of the corresponding slice. Numeral 313 indicates the search key which is transmitted to the (l+1)-th level of the corresponding slice. Input/output lines 314 and 315 respectively transmit the left boundary and the right boundary determined as the results of the operations at the particular level of the corresponding slice.

Figure 11:
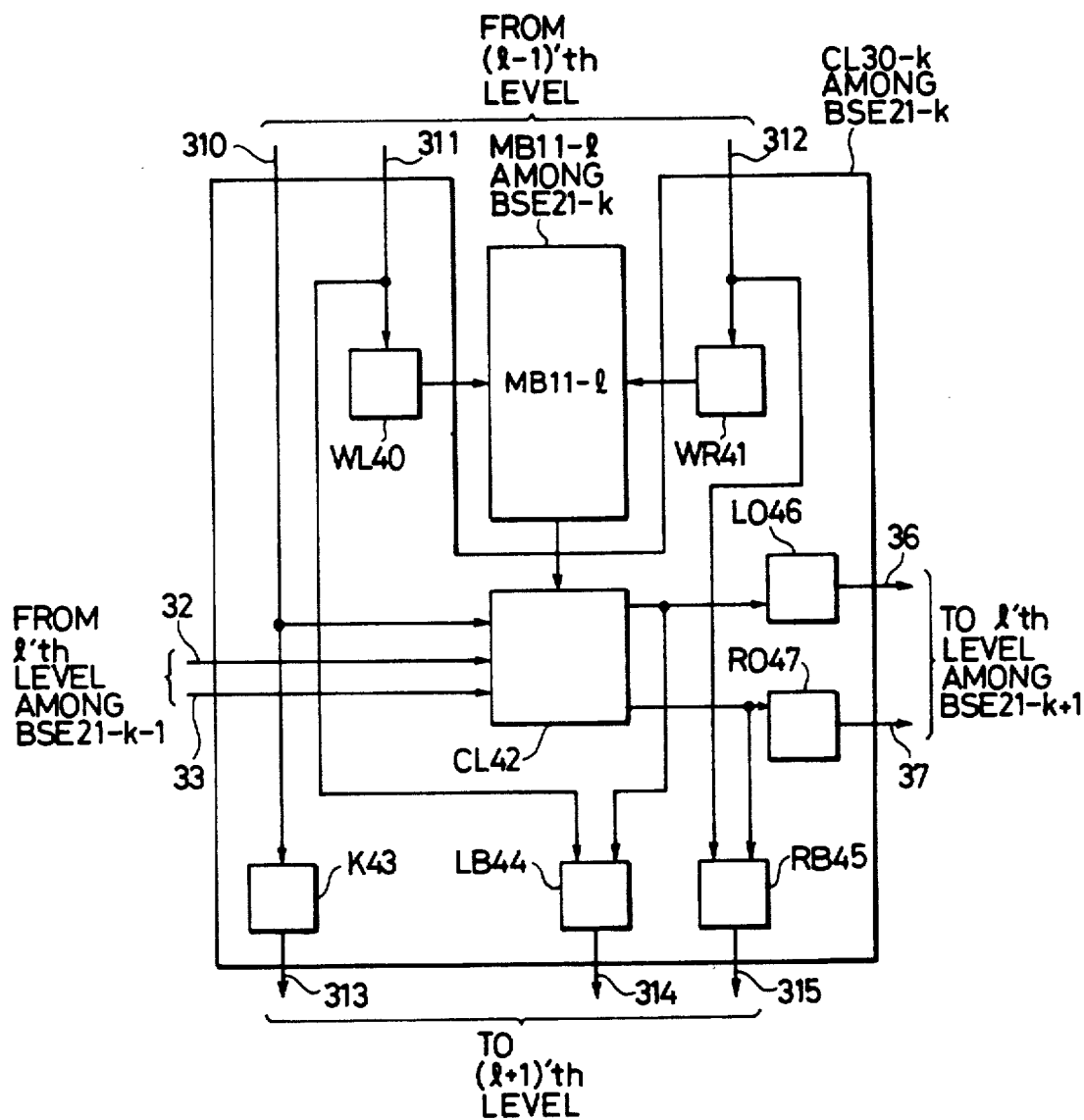
FIG. 11 is an arrangement diagram of a control circuit within the bit sliced engine.

FIG. 11 is a block diagram of the control circuit 30-l of the l-th level in the bit sliced engine 21-k shown in FIG. 10. Symbol W1 40 denotes a latch which is supplied with the left boundary determined as the result of the operation of the (l−1)-th level, while symbol WR 41 denotes a latch which is supplied with the right boundary determined as the result of the operation of the (l−1)-th level. Shown at symbol CL 42 is a control circuit which receives the search key as well as the key word in the memory bank pointed by the left boundary and the right boundary determined at the (l−1)-th level and the control information items expressive of the movements of the left boundary and the right boundary as supplied from the l-th level in the BSE 21-k−1, and which delivers the movements of the left boundary and the right boundary at the particular level of the corresponding slice to the l-th level in the BSE 21-k+1. Symbol K 43 denotes a latch for the search key which is received from the (l−1)-th level. A register LB 44 receives the movement of the left boundary being the operated result at the particular level of the corresponding slice and the left boundary determined at the (l−1)-th level and delivers the left boundary determined at the l-th level, while a register RB 45 receives the movement of the right boundary being the operated result at the particular level of the corresponding slice and the right boundary determined at the (l−1)-th level and delivers the right boundary determined at the l-th level. A latch LO 46 receives the movement of the left boundary being the operated result at the particular level and delivers the movement of the left boundary to the l-th level of the BSE 21-k+1, while a latch RO 47 receives the movement of the right boundary being the operated result at the particular level and delivers the movement of the right boundary to the l-th level of the BSE 21-k+1.

The CL 42 is such that the state transition diagram of FIG. 8 has been realized by the circuit arrangement. Between the l-th level in the BSE 21-k and the tables in FIGS. 8(a) and 8(b), the information 32 corresponds to $CI^L$, the information 33 to $CI^R$, the information 36 to $CO^L$, and the information 37 to $CO^R$. The respective registers LB 44 and RB 45 determine the left boundary and the right boundary at the l-th level by adding bits expressive of the movements of the left boundary and the right boundary determined at the particular level, to the least significant bits of the left boundary and the right boundary received from the (l−1)-th level, and transmit the determined left and right boundaries to the (l+1)-th level.

Figure 12:
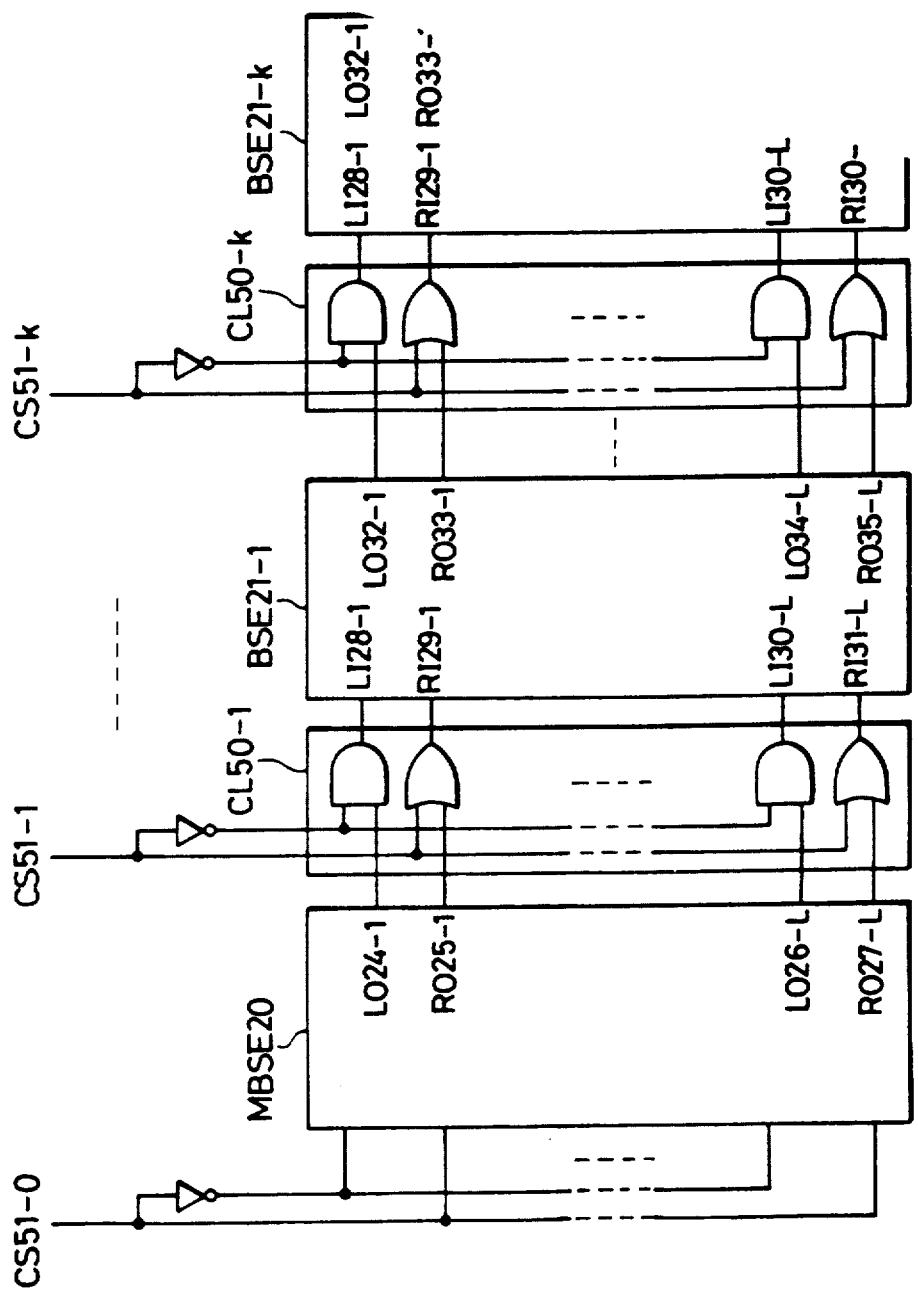
FIG. 12 is a diagram for elucidating a case of handling variable-length data by means of the bit sliced engine.

FIG. 12 is for explaining a case where variable-length data are handled with the bit sliced engines. Symbol CL 50 denotes a control circuit which performs the separation control of the bit sliced engine, and symbol CS 51 a control signal which is input to the control circuit CL 50. The CS 51-0 is normally ON, and is input to the MBSE 20. Each BSE 21 is furnished with the CL 50 as shown in FIG. 12, and the CS 51 is turned ON or OFF.

This makes it possible to supply respective inputs LI 28 and RI 29 with the output signals LO 32 and RO 33 of the immediate upper-digit slice as they are (for CS 51=OFF) or to supply the input LI 28 with '0' and RI 29 with '1' at all times (for CS 51=ON). The control signal is applied to the respective levels of the identical slice in common. The 8SEs 21-k whose CSs 51-k have been turned ON operate equivalently to the MBSE 20 which processes the most significant m bits of a search key. Accordingly, one searching engine which executes the searching process of long data or a plurality of searching engines each of which executes the searching process of short data can be built by setting desired ones of the CSs 51 to be ON and OFF.

According to the present invention, a sorter conforming to the variation of a data length can be flexibly built. Here, the sorter signifies an apparatus in which devices as shown in FIG. 1 are serially connected in a plurality of stages. Information which is output from each bit sliced merger is composed of 2 bits, and the number of stages of the mergers which are required for sorting N data is log 2N. Therefore, the number of pins, which are required in a case where a circuit with the bit sliced mergers connected in N stages is put into the form of a chip, becomes 4 log 2N with input/output control information taken into account. This value is 48 when N=4096 is assumed. In case of slicing in single bit unit, one pin for each of input data and output data and further pins for $V_{cc}$ (power source), ground (earth), etc. are required, and the total number of the required pins suffices with 50 odd. Besides, the number of required transistors is predicted to be on the order of 100 thousands in a static RAM and on the order of 50 thousands in a dynamic RAM, and the LSI implementation thereof will be satisfactorily possible with the present-day LSI technology.

Further, according to the present invention, a searching engine conforming to the variation of a data length can be flexibly built. Here, the searching engine is an apparatus in which a plurality of bit sliced engines are connected. Control information which is input from and output to each bit sliced engine is composed of 2 bits, and $LOG_2N$ comparators are required in a searching process which handles N key words. Therefore, the number of pins which are required in the LSI implementation of the bit sliced engines becomes $4 \cdot LOG_2N$ with the input/output control information taken into account. This value becomes 48 when N=4096 is assumed. In case of subjecting a search key to 1-bit slicing, the number of pins suffices with 50 odd even when pins for input data, a power source, ground etc. are added. Besides, the number of required transistors is predicted to be on the order of 100 thousands in an SRAM (Static Random Access Memory) and on the order of 50 thousands in a DRAM (Dynamic Random Access Memory), and they can be satisfactorily realized with the present-day LSI technology.

We claim:

1. A merging/sorting method in a system having a plurality of input buffers each of which stores two steps of m-bit data provided by bit-slicing each of two sets of input data every m bits and a plurality of serially connected bit-sliced engines each of which merges two sets of bit-sliced input data stored in a corresponding input buffer, wherein each bit sliced engine is connected to a corresponding input buffer comprising the steps of:

executing, in first bit-sliced engine, merge processing based on two sets of m-bit data of an upper digit of an upper most digit stored in a corresponding input buffer;

delivering, in said first bit-sliced engine, control information related to a result of said merge processing to a second bit-sliced engine;

successively executing, in each of second to n-th bit sliced engine, merge processing based on two sets of m-bit data stored in a corresponding input buffer and control information carried from a bit-sliced engine for processing two sets of m-bit data of an immediate upper digit; and delivering, in said each of second to n-th bit-sliced engines, control information related to a result of merge processing to a bit-sliced engine for processing two sets of m-bit data of an immediate lower digit;

wherein said each bit sliced engine is connected to receive the control information from the bit sliced engine for processing m bits of an immediate upper digit and is connected to deliver the control information to the bit sliced engine for processing m bits of an immediate lower digit; and wherein said each bit sliced engine includes, two pointers, said two pointers being provided in correspondence with the respective sets of input data wherein said two pointers indicate those addresses of said buffer which store said respective sets of input data, said two pointers are advanced respectively in response to the control information carried from the bit sliced engine for processing m-bits of an immediate upper digit.

2. A merging/sorting method as defined in claim 1, wherein among said bit sliced engines, any bit sliced engine other than the bit sliced engine for processing m bits of an uppermost digit controls its operation on the basis of differences between said two pointers and the pointers corresponding to the bit sliced engine for processing m bits of an immediate upper digit.

3. A merging/sorting method as defined in claim 2, wherein said bit sliced engine other than said bit sliced engine for processing the m bits of the uppermost digit controls its operation on the basis of differences between said two pointers and the pointers corresponding to the engine for processing m-bits of an immediate upper digit, when neither of the differences of said two pointers is zero.

4. A merging/sorting method as defined in claim 2, wherein the operation control of said engine other than said bit sliced engine for processing the m bits of the uppermost digit is such that, when either or both of the differences of said two pointers is zero, the pointer is not advanced.

5. A merging/sorting method as defined in claim 1, wherein when either of said two pointers and the two data stored in the addresses of said input buffer is to be selected, both said pointers are advanced subject to said two data being equal; and when said two pointers have been advanced beyond a predetermined amount, a counter, indicative of a number of times of such advances is incremented by one, and a content of the corresponding data is stored as stored data in said bit sliced engine.

6. A merging/sorting method as defined in claim 5, wherein the stored data items in a number accumulated in said counter are output without advancing either of said two pointers, when any of the following three conditions are satisfied:

Condition 1: Both the differences of the two sets of pointers become zero;

Condition 2: Either of the differences of the two sets of pointers is zero, and the data stored in the address of said buffer indicated by the pointer not affording the zero difference is different from said stored data;

Condition 3: Neither of the differences of said two sets of pointers is zero, and a smaller one of the two data stored in the addresses of said buffer indicated by the respective pointers is different from said stored data.

7. A merging/sorting apparatus comprising:
   a plurality of input buffers each of which stores two sets of m-bit data provided by dividing each of two sets of input data every m bits; and
   a plurality of serially connected processing units each of which merges two sets of input data divided into two sets of m-bit data, wherein each processing unit is connected to a corresponding input buffer and compares said two sets of m-bit data stored in the corresponding input buffer and outputs either set of m-bit data as the results of said comparison, said processing units comprises first to n-th processing units wherein said first processing unit compares two sets of an upper most m-bit data, outputs either set of upper most m-bit data as a result of said comparison and delivers control information related to the output result to a processing unit for processing sets of an immediate lower m-bit data, and wherein each of second to n-th processing units compares two sets of m-bit data, outputs either set of m-bit data based on a result of said comparison and on control information carried from a processing unit which processes the sets of an immediate upper m-bit data and delivers control information related to the output result to a first processing unit which processes the sets of an immediate lower m-bit data;
   wherein each of said processing units includes two pointers being provided in correspondence with respective sets of m-bit data for indicating addresses of said input buffer which store the respective sets of m-bit data and wherein said two pointers are advanced respectively in response to control information from a processing unit which processes the sets of m-bit data of an immediate upper m-bit data.

8. A merging/sorting apparatus comprising:
   a plurality of input buffers each of which stores two sets of m-bit data provided by dividing each of two sets of input data every m bits; and
   a plurality of serially connected processing units each of which merges two sets of input data divided into two sets of m-bit data, wherein each processing unit is connected to a corresponding input buffer and compares said two sets of m-bit data stored in the corresponding input buffer and outputs either set of m-bit data as the results of said comparison, said processing units comprise first to n-th processing units wherein said first processing unit compares two sets of an upper most m-bit data, outputs either set of upper most m-bit data as a result of said comparison and delivers control information related to the output result to processing unit for processing sets of an immediate lower m-bit data, and wherein each of second to n-th processing units compares two sets of m-bit data, outputs either set of m-bit data based on a result of said comparison and on control information carried from a processing unit which processes the sets of an immediate upper m-bit data and delivers control information related to the output result to a first processing unit which processes the sets of an immediate lower m-bit data;
   a plurality of control units connected to respective processing units, wherein each control unit in response to a control signal selectively controls the input of control information to a corresponding processing unit, said control information being provided by a processing unit which processes the sets of an immediate upper m-bit data;
   wherein each of said processing units includes two pointers being provided in correspondence with respective sets of m-bit data for indicating addresses of said input buffer which store the respective sets of m-bit data and wherein said two pointers are advanced respectively in response to control information from a processing unit which processes the sets of m-bit data of an immediate upper m-bit data.

* * * * *